Patented Mar. 25, 1924.

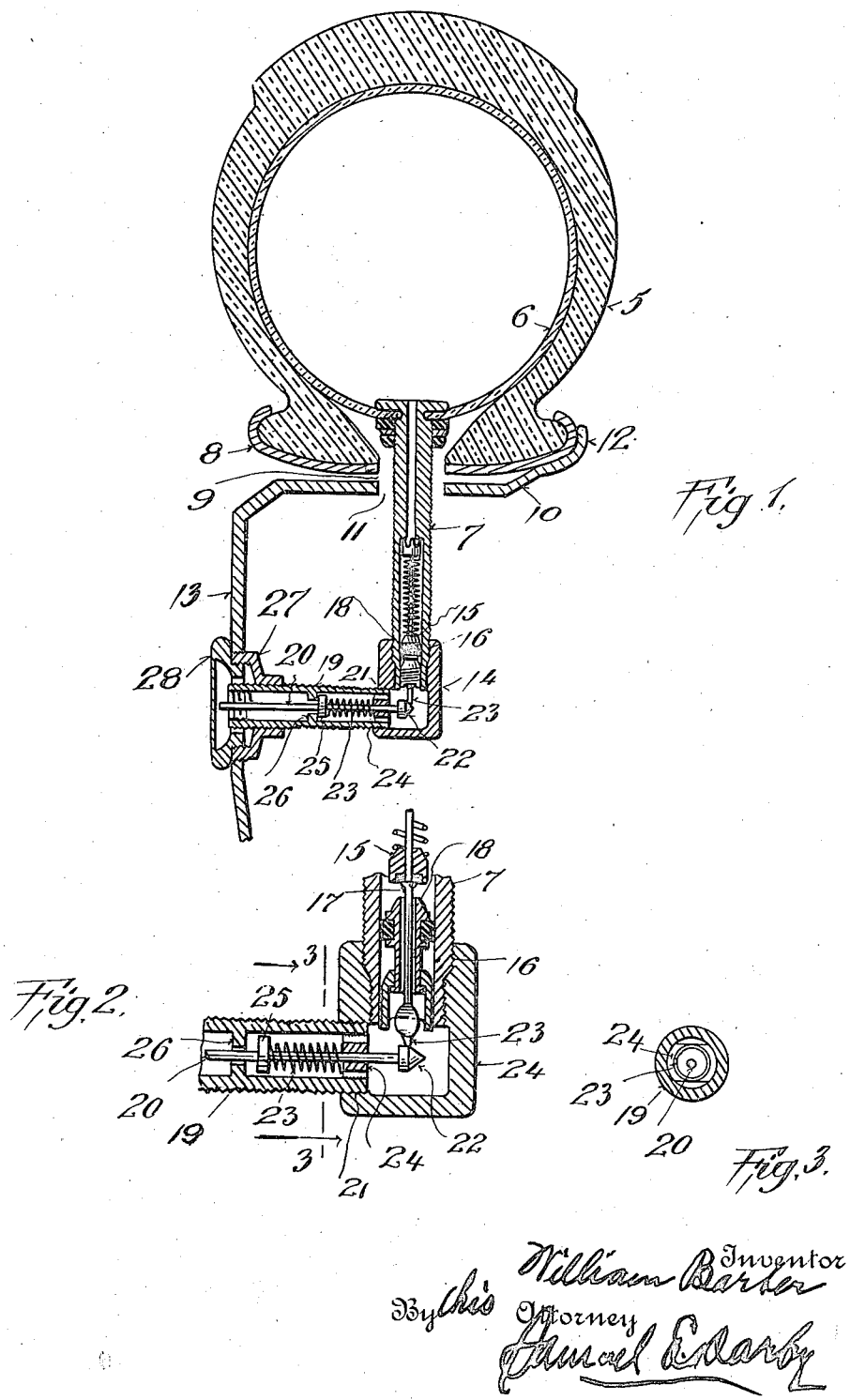

1,487,831

UNITED STATES PATENT OFFICE.

WILLIAM BARBER, OF BROOKLYN, NEW YORK.

TIRE-INFLATING CONNECTION FOR WHEELS.

Application filed August 6, 1920. Serial No. 401,630.

*To all whom it may concern:*

Be it known that I, WILLIAM BARBER, a citizen of the United States, residing at Brooklyn, county of Kings, State of New York, have made a certain new and useful Invention in Tire-Inflating Connections for Wheels, of which the following is a specification.

This invention relates to tire inflating connections for vehicle wheels.

The object of the invention is to provide means or connections which are simple in construction, economical to manufacture, and efficient in operation for inflating pneumatic tires employed in connection with automobile and other vehicles.

A further object of the invention is to provide a construction of tire inflating connection which permits the easy and ready removability of the tire from the rim in which it is seated, or the tire and rim from the felly of the wheel.

A further object of the invention is to provide a tire inflating connection for vehicle wheels which is easily accessible from outside of the wheel where the structure of the wheel would otherwise render such inflating connections inaccessible.

Other objects of the invention will appear more fully hereinafter.

The invention consists substantially in the construction, combination, location, and relative arrangement of parts, all as will be more fully hereinafter set forth, as shown by the accompanying drawing, and finally pointed out in the appended claims.

Referring to the accompanying drawing,—

Fig. 1 is a view in section, taken transversely, of a pneumatic tire as applied to a vehicle wheel, and the application thereto of tire inflating connections employing the principles of my invention.

Fig. 2 is a broken detail view in section of a portion of the tire inflating connections.

Fig. 3 is a detail view in section on the line 3, 3, Fig. 2, looking in the direction of the arrows.

The same part is designated by the same reference numeral wherever it occurs throughout the several views.

In the application of pneumatic tires to certain classes of wheels, such for example as heavy truck wheels of the double tire type, stamped metal disk wheels, cast metal wheels, and the like, the ordinary inner tube inflating nipple, which, when the tire is applied to a rim and the rim to the wheel felly, projects through openings in the rim and felly, is inaccessible for convenient connection thereto of the pump tube employed to effect the inflation thereof. Ordinarily, in the case of stamped disk wheels, for example, the tire inflating nipple is disposed at the inner side or face of the outer side plate, thereby making it difficult, if not impossible, to conveniently reach the same with a pump tube for attachment thereto when it is desired to inflate the tire without removing it from the wheel. Various attempts have been made to extend the tire inflating connections or nipple through the outer side plate or face of the wheel in order to afford access thereto for attachment of the pump tube. The efforts in this direction, however, have not resulted in the production of a practical device for the purpose for the reason that such extensions prevent the ready removability of the tire, or the tire and rim, from the wheel. A permanent connection of the tire nipple through a hole or opening in the outer face or side plate of the wheel is therefore impractical.

It is among the special purposes of my present invention to provide a simple construction which permits a tire to be readily, easily and quickly applied in the ordinary manner to the felly of a disk or other form of wheel, or to be removed therefrom while at the same time affording easy and ready accessibility from the outer face or side of the wheel for gauge readings and for connecting a pump tube to the tire inflating nipple at the outer face or side of the wheel.

In the drawing I have shown at 5 a shoe for a pneumatic tire which may be of the ordinary construction, and having an inner inflatable tire 6, the latter provided with the usual nipple 7 for inflating purposes. This nipple is attached to the inner tube in the usual or any ordinary well known convenient manner. I have also shown the shoe with its inner tube and tube nipple applied to a wheel rim 8 which may be of the usual or any ordinary construction, the nipple 7 extending through a hole 9 in the rim. In the example illustrated, the rim 8 is shown applied to the felly portion 10 of a stamped disk wheel with the nipple 7 extending through a hole or opening 11 in said felly portion. The rim 8 is shown of the well known demountable type which is held or clamped at one edge against an upwardly extending flange portion 12 of the wheel felly in any suitable convenient and well known manner (not shown).

In the example of wheel selected for illustrating an application of my invention, the wheel includes an outer disk member 13, which, if desired, and as is usual, may be formed with a dish. When the tire with its associated inflating nipple 7 is applied to the wheel, said nipple is disposed at the inner side or face of the outer wheel member 13, thereby rendering it inaccessible or inconvenient for attachment thereto of a pump tube or gauge when it is desired to inflate the tire or to ascertain the inflating pressure of the tire. To avoid this objection and to render the nipple easily and readily accessible for attachment of a pump tube or gauge thereto, I provide a fitting 14 having threaded bore portions disposed in angular relation with respect thereto. The outer externally threaded end portion of the nipple 7 is received in one of the internally threaded bores of the fitting 14 as indicated at 16. The usual spring pressed valve 15 carried upon a valve stem 17 and cooperating with the packed valve seat member 18 is mounted in the ordinary manner within the nipple 7. This valve structure is of the ordinary character, and in the specific details thereof form no part of my present invention. The function of this valve is the ordinary function of lifting when a gauge is applied to the end of the nipple 7 to ascertain the inflating pressure of the tire or when a pump tube is applied to the end of the nipple for inflating purposes, said valve becoming seated automatically and held to its seat upon removal of the gauge or the pump tube connection. A tubular member or sleeve 19 is screwed into the other bore of the fitting 14, as indicated at 21, which tubular member or sleeve is adapted to extend laterally from the fitting 14 through the outer face or side member 13 of the wheel so as to be accessible from the outer side or face thereof for attachment thereto of a gauge or pump tube. Mounted within the tube or sleeve 19 is a longitudinally slidable member or stem 20 carrying an engaging head 22 at its inner end, arranged, when said stem is moved inwardly, to engage the outer tip or end 23 of the stem 17 of valve 15 to cause said valve to be unseated. To facilitate this action I prefer to form the head 22 with a taper so that when the stem 20 is shifted longitudinally inwardly from the position shown in Fig. 1 to that shown in Fig. 2 a longitudinal displacement of the valve stem 17 and the unseating of the valve 15 is accomplished. The stem 20 is normally held in its withdrawn position, with its outer extremity projected slightly beyond the outer end or sleeve 19. This may be accomplished in any suitable or well known manner. I have shown a simple arrangement wherein a spring 23 is interposed between a guide bearing 24 formed at the inner end of the tube 19, and a collar 25 carried by the stem 20. The tension of this spring normally serves to hold the collar 25 against a suitable shoulder 26 within the sleeve or tube 19.

The ordinary dust cap may be applied to the outer end of the tube. I have shown a form of dust cap particularly well adapted for use in connection with disk wheels wherein a collar 27 is threaded onto the sleeve 19 and into a threaded opening in the outer disk portion 13 of the wheel, and the dust cap 28 is threaded into the collar 27. My invention, however, is not to be limited or restricted in respect to the form or mounting of dust cap employed.

By the construction above described ready, easy and convenient access is had at the outer face or side of the wheel to the tire nipple for the purpose of applying thereto a pressure gauge or a pump for the purpose of inflating the tire. When it is desired to remove the tire from the wheel or from the tire rim it is only necessary to unscrew and remove the dust cap and the sleeve 19 from the threaded engagement of the latter in the threaded bore of the fitting 14, whereupon the tire may be easily removed from the wheel in the ordinary and usual manner, the nipple 7 with the fitting 14 applied thereto being withdrawn through the opening 11 in the felly portion of the wheel, where the tire and rim are moved together. If the tire alone is removed, then the nipple 7 with the fitting 14 applied thereto, is withdrawn through the hole or opening 11 in the felly portion of the wheel and through the hole 9 in the rim in the usual and ordinary manner, the relative sizes of the holes 11 and 9 being so proportioned as to permit the fitting 14 to pass readily and easily therethrough.

While I have shown and described my invention as applied to a demountable rim structure, it is to be understood that my invention is not to be limited or restricted in this respect as a tire inflating device embodying my invention is equally well applicable to any of the commercial forms of tires and tire mountings for disk, cast, wooden, and other wheels, and the advantages of accessibility to the nipple for tire inflating purposes or for the application of pressure gauges thereto when the tire is in position on the wheel from the outer side or face of the wheel are attained and realized, while at the same time I am enabled to readily and easily detach and remove, or apply the tire by simply unscrewing the tubular member or sleeve 19.

Where the collar 27 is employed this collar serves the purpose of a lock nut to prevent the sleeve 19 from working loose or backing off, as well as to receive the dust cap 28.

Having now set forth the objects and nature of my invention, and a construction embodying the principles thereof, what I claim as new and useful and of my own invention, and desire to secure by Letters Patent is,—

1. In a tire valve or the like, the combination with such valve, of an extension and a deflating device in said extension movable angularly to the movement of the valve pin and adapted to depress the latter and said deflating device having a part in proximity to the end of the extension whereby to be engaged by a gauge or the like.

2. In a tire valve structure for disk wheels the combination with a nipple adapted to be attached to the tire, and a check valve, said nipple and check valve being located at one side of the disk wheel, of an unseating device for, but normally maintained out of engaging relation with respect to said valve, said unseating device arranged to extend to the other side of the disk wheel, to be engaged and operated to unseat said valve upon application thereto of an inflating pump or a gauge for a gauge reading.

3. In a tire valve structure for disk wheels, the combination with a nipple disposed at the inner side of the disk wheel and adapted to be connected to the tire, of an extension for said nipple arranged to terminate at the outer side of the disk wheel, and means in said extension, and normally maintained retarded out of operative position, arranged to be engaged and actuated into operative relation upon application to the terminal of said extension of a tire inflating pump connection, or of a gauge for a gauge reading, whereby the tire may be inflated or a gauge reading taken therefrom at the outer side of the disk wheel.

4. In a tire valve structure for disk wheels, the combination with a nipple disposed at the inner side of the disk wheel, and adapted to be connected to the tire, and a valve arranged in said nipple, of means extending to the outer side of the disk wheel for application thereto of a pump connection for inflating the tire, or of a gauge for taking a pressure reading from the tire, said means operating when actuated by the application thereto of a pump connection or a gauge to unseat said valve, and means to normally maintain said valve unseating means retarded from engagement with said valve.

5. In a tire valve structure for disk wheels, a tire valve located at the inner side of the disk wheel, and means accessible at the outer side of the disk wheel and normally restrained out of engagement with said valve for unseating said valve in inflating the tire or in taking gauge readings therefrom.

6. In a tire valve or the like, the combination with such valve, of an extension and a deflating device in said extension movable angularly to the movement of the valve pin and adapted to depress the latter and said deflating device having a part in proximity to the end of the extension whereby to be engaged by a gauge or the like.

7. In a tire valve structure for disk wheels, the combination with a nipple to be attached to the tire and disposed at the inner side of the disk wheel, and an extension for said nipple, said extension terminating at the outer side of the disk wheel for application thereto of a tire inflating pump or a tire pressure reading gauge, of a check valve and an unseating device for said valve, normally restrained out of engagement with said valve, said valve unseating device being disposed in said extension to be engaged and actuated by the application of the pump connection or gauge thereto.

8. In a valve for tires or the like, a fitting having means for detachable connection to the valve and having a part in line with the valve and a part at an angle thereto, a movable member located in said fitting adapted to move at an angle relative to the valve pin, and means for depressing the valve pin upon movement of said member, and said second named part having a portion arranged at the outer end of the fitting for engagement with a gauge or the like.

9. In a valve for tires or the like, a fitting having means for detachable connection to the valve and having a part in line with the valve and a part at an angle thereto, a movable member in said fitting adapted to move at an angle relative to the valve pin, means for depressing the valve pin by and in accordance with the movement of said member, and said second named part having a portion arranged at the outer end of the fitting for engagement with a gauge or the like, and means for normally retaining said member relative to said valve pin in a position whereby said valve remains seated.

10. In a tire valve structure for disk wheels, a valve device to control the inflation of or gauge readings from the tire, and having means for application thereto of an inflating pump connection or a pressure reading gauge, the connection of said device to the tire being at the inner side of the disk wheel and the means for applying the pump or gauge being at the outer side of the disk wheel, said valve device including means normally restrained out of operating position and adapted to be engaged and operated into actuating position upon application of an inflating pump connection or a pressure gauge to permit the tire to be inflated or its pressure reading to be taken from the outer side of the disk wheel.

In testimony whereof I have hereunto set my hand on this 31st day of July A. D., 1920.

WILLIAM BARBER.